(12) United States Patent
Simanovsky et al.

(10) Patent No.: US 11,087,468 B2
(45) Date of Patent: Aug. 10, 2021

(54) ITEM CLASSIFICATION USING LOCALIZED CT VALUE DISTRIBUTION ANALYSIS

(71) Applicant: Analogic Corporation, Peabody, MA (US)

(72) Inventors: Sergey Simanovsky, Brookline, MA (US); David Schafer, Rowley, MA (US)

(73) Assignee: Analogic Corporation, Peabody, MA (US)

( * ) Notice: Subject to any disclaimer, the term of this patent is extended or adjusted under 35 U.S.C. 154(b) by 71 days.

(21) Appl. No.: 16/342,474

(22) PCT Filed: Oct. 19, 2016

(86) PCT No.: PCT/US2016/057643
§ 371 (c)(1),
(2) Date: Apr. 16, 2019

(87) PCT Pub. No.: WO2018/075024
PCT Pub. Date: Apr. 26, 2018

(65) Prior Publication Data
US 2019/0259160 A1 Aug. 22, 2019

(51) Int. Cl.
*G06T 7/11* (2017.01)
*G06T 7/136* (2017.01)
(Continued)

(52) U.S. Cl.
CPC .............. *G06T 7/11* (2017.01); *G01N 23/046* (2013.01); *G01V 5/005* (2013.01);
(Continued)

(58) Field of Classification Search
CPC .......... G01N 23/046; G01N 2223/419; G01N 2223/09; G06T 7/11; G06T 2207/10081; G06K 2209/09; G06K 9/00201
See application file for complete search history.

(56) References Cited

U.S. PATENT DOCUMENTS 5,712,926 A * 1/1998 Eberhard et al. ........ G06K 9/46
6,195,441 B1   2/2001 Simanovsky et al.
(Continued)

FOREIGN PATENT DOCUMENTS

WO     2010/050952 A1   5/2010

OTHER PUBLICATIONS

Greg Flitton; Toby P. Breckon; Najla Meghrebi: "Object Recognition using 3D SIFT in Complex CT Volumes"; 2010, BMVC2010 doi:10.5244/C.24.11, pp. 1-12. (Year: 2010).*

(Continued)

*Primary Examiner* — Siamak Harandi
(74) *Attorney, Agent, or Firm* — TraskBritt (57) ABSTRACT

Among other things, one or more systems and/or techniques for classifying an item disposed within an object are provided herein. A three-dimensional image of the object (e.g., a bag) is segmented into a set of item representations (e.g., laptop, thermos, etc.). An item is identified from the set of item representations based upon item features of the item, such as the laptop that could be used to conceal an item of interest such as an explosive. A region comprising a three-dimensional image of the item is divided into a set of sub-regions (e.g., a first sub-region encompassing a screen, a second sub-region encompassing a motherboard, etc.). The item is classified as a potential first type of item (e.g., an explosive laptop) when any sub-region has a number of (Continued)

voxels, with computed tomography (CT) values within a range of known CT values for a first type of item, exceeding a threshold.

21 Claims, 10 Drawing Sheets

(51) Int. Cl.
    *G06T 7/162*     (2017.01)
    *G01N 23/046*     (2018.01)
    *G01V 5/00*     (2006.01)
    *G06K 9/00*     (2006.01)
    *G06K 9/46*     (2006.01)

(52) U.S. Cl.
    CPC ..... *G06K 9/00201* (2013.01); *G06K 9/00771* (2013.01); *G06K 9/4647* (2013.01); *G06T 7/136* (2017.01); *G06T 7/162* (2017.01); *G01N 2223/419* (2013.01); *G06K 2209/09* (2013.01); *G06T 2207/10081* (2013.01)

(56) References Cited

U.S. PATENT DOCUMENTS

| | | | |
|---|---|---|---|
| 7,539,337 | B2 | 5/2009 | Simanovsky et al. |
| 8,260,020 | B2* | 9/2012 | Garms et al. |
| 9,996,890 | B1* | 6/2018 | Cinnamon ............. G06K 9/627 |
| 2009/0169051 | A1 | 7/2009 | Ioannou et al. |
| 2009/0175411 | A1* | 7/2009 | Gudmundson ...... G06K 9/3241 |
| | | | 378/57 |
| 2013/0163811 | A1 | 6/2013 | Oelke |

OTHER PUBLICATIONS

International Written Opinion for International Application No. PCT/US2016/057643, dated Jun. 19, 2017, 8 pages.

International Search Report for International Application No. PCT/US2016/057643, dated Jun. 19, 2017, 6 pages.

European Communication pursuant to Article 94(3) EPC for European Application No. 16791726.9, dated Apr. 20, 2021, 5 pages.

* cited by examiner

ITEM CLASSIFICATION USING LOCALIZED CT VALUE DISTRIBUTION ANALYSIS

CROSS-REFERENCE TO RELATED APPLICATION

This application is a national phase entry under 35 U.S.C. § 371 of International Patent Application PCT/US2016/057643, filed Oct. 19, 2016, designating the United States of America and published in English as International Patent Publication WO 2018/075024 A1 on Apr. 26, 2018.

TECHNICAL FIELD

The present application relates to the field of computed tomography (CT). It finds particular application with security systems configured to image an object and to identify items of interest, such as potential threat items, within the object. It also relates to medical, industrial, and/or other applications where identifying items within an object under examination would be useful.

BACKGROUND

Security at airports and in other travel related areas is an important issue. One technique used to promote travel safety is baggage inspection. Often, a radiation imaging modality is utilized to facilitate baggage screening. For example, a CT system may be used to provide security personnel with two and/or three dimensional views of objects. After viewing images provided by an imaging apparatus, security personnel may make a decision as to whether the baggage is safe to pass through a security check-point or if further (hands-on) inspection is warranted.

To reduce human error associated with identifying potential threat items inside the baggage, automated object recognition systems may be utilized. Such systems can extract an item from an image of an object, such as a shaving cream container within a bag, and compute properties of the item based upon properties/elements of the image. The computed properties of the item can then be used for discriminating the item by comparing the item's properties (e.g., density, effective atomic number, shape, etc.) with known properties of threat items, non-threat items, and/or both classes of items, etc.

Unfortunately, artifacts in an image of an item may degrade the ability of the automated object recognition system to correctly identify the item or label the item as a threat or non-threat. Such artifacts are usually generated by high density components, such as components inside electronic devices (e.g., an optical drive, a laptop battery, or other high atomic number Z components), and can distort characteristics (e.g., density values, z-effective values, etc.) of the image. Accordingly, specialized techniques are used to identify threat items (e.g., explosives) concealed within these devices.

BRIEF SUMMARY

Aspects of the present application address the above matters, and others. According to one aspect a method for classifying an item disposed within an object is provided. The method comprises receiving a three-dimensional image of the item and dividing the three-dimensional image of the item into a set of sub-regions. The method also comprises, for a first sub-region of the set of sub-regions, binning voxels disposed within the first sub-region into a first set of bins based upon computed tomography (CT) values of each voxel disposed within the first sub-region. The method further comprises classifying the item as a potential first type of item when a number of voxels, within the first sub-region and having CT values within a range of known CT values for a first type of item, exceeds a specified threshold.

According to another aspect, a computing device, comprising a processing unit and memory, is provided. The memory comprises processor-executable instructions that when executed by the processing unit cause performance of operations. The operations comprise segmenting a three-dimensional image of an object into a set of item representations. The operations also comprise calculating item features of the set of item representations. The operations also comprise identifying a potential concealment item from the set of item representations based upon item features of a potential concealment item representation, of the set of item representations, for the potential concealment item. The operations also comprise defining a region within the three-dimensional image of the object that encompasses the potential concealment item. The operations also comprise dividing the region into a set of sub-regions. The operations further comprise classifying the potential concealment item as comprising a potential first type of item when a number of voxels, within the first sub-region and having CT values within a range of known CT values for a first type of item, exceeds a specified threshold.

According to another aspect, a non-transitory computer readable medium, comprising computer executable instructions that when executed via a processing unit cause performance of operations, is provided. The operations comprise segmenting a three-dimensional image of an object into a set of item representations. The operations also comprise calculating item features of the set of item representations. The operations also comprise identifying a potential concealment item from the set of item representations based upon item features of a potential concealment item representation, of the set of item representations, for the potential concealment item. The operations also comprise defining a region with the three-dimensional image of the object that encompasses the potential concealment item. The operations also comprise dividing the region into a first sub-region, a second sub-region, and a third sub-region. The operations further comprise evaluating CT values of voxels within the first sub-region, the second sub-region, and the third sub-region to determine that an instance of a first type of object exists within any of the first sub-region, the second sub-region, or the third sub-region. The operations further comprise classifying the potential concealment item as comprising a potential first type of item when the first type of object is determined to exist within any of the first sub-region, the second sub-region, or the third sub-region.

Those of ordinary skill in the art may appreciate still other aspects of the present application upon reading and understanding the appended description.

BRIEF DESCRIPTION OF THE DRAWINGS

The application is illustrated by way of example and not limitation in the figures of the accompanying drawings, in which like references generally indicate similar elements and in which.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Among other things, one or more systems and/or techniques for classifying an item disposed within an object are provided for herein. An object, such a bag, may comprise various items, such as shoes, a laptop, a book, etc. One of the items may be used to conceal an item of interest, such as a threat item (e.g., explosives). For example, the threat item may be concealed within the laptop (e.g., a hard drive may be removed from a hard drive bay within the laptop, and the explosives may be stored within the hard drive bay). In order to evaluate the bag for identifying items of interest, the bag may be scanned to create a three-dimensional image of the bag. The three-dimensional image may be segmented to identify a set of item representations of items within the bag (e.g., where each item representations is a three-dimensional image depicting an individual item, such as a laptop, within the bag). Properties of each item (e.g., density, effective atomic number, shape, etc.) can be extracted from the item representations and can be compared with known properties of threat items to determine whether the item is a potential threat item. Unfortunately, false negatives can occur when threat material is concealed within certain types of items, such as electronics or other flat, highly dense objects, because the contiguity of voxels representing threat material may be broken by image artifacts into multiple, disconnected parts. Moreover, false negatives can occur if the threat material is disposed in multiple neighboring, but distinct areas within a concealing item, such as the laptop.

Accordingly, as provided herein, items of interest, such as threat items, concealed within concealment items, such as electronics, may be identified with improved accuracy. In particular, a region is identified that comprises a three-dimensional image of an item (e.g., a laptop), and the region is then divided into a set of sub-regions. For example, a region comprises a three-dimensional image of the laptop is divided into a first sub-region encompassing a screen of the laptop, a second sub-region encompassing a motherboard of the laptop, a third sub-region compassing a hard drive bay and other components of the laptop, etc. Sub-regions may comprise any shape, size, or configuration. Sub-regions may encompass an entire component (e.g., a battery), a portion of a component, or multiple components or portions thereof. Moreover, sub-regions may be mutually exclusive (e.g., no voxels are shared between sub-regions) or sub-regions may overlap (e.g., some sub-regions may share at least some voxels).

Sub-regions are evaluated on an individual sub-region basis to determine whether a particular type of item, such as threat material, is within a sub-region. For example, voxels within a sub-region may be binned into a set of bins based upon a CT value (e.g., density value, z-effective value, etc.) of each voxel disposed within the sub-region. The item may be classified as a potential type of item (e.g., a threat item) when the number of voxels within the sub-region have CT values, within a range of known CT value for the type of item, that exceed a specified threshold (e.g., independent of the CT values of voxels within other sub-regions of the item). In this way, the laptop may be classified as an explosive item when one or more sub-regions of the laptop or other item potentially include explosives.

Figure 1:
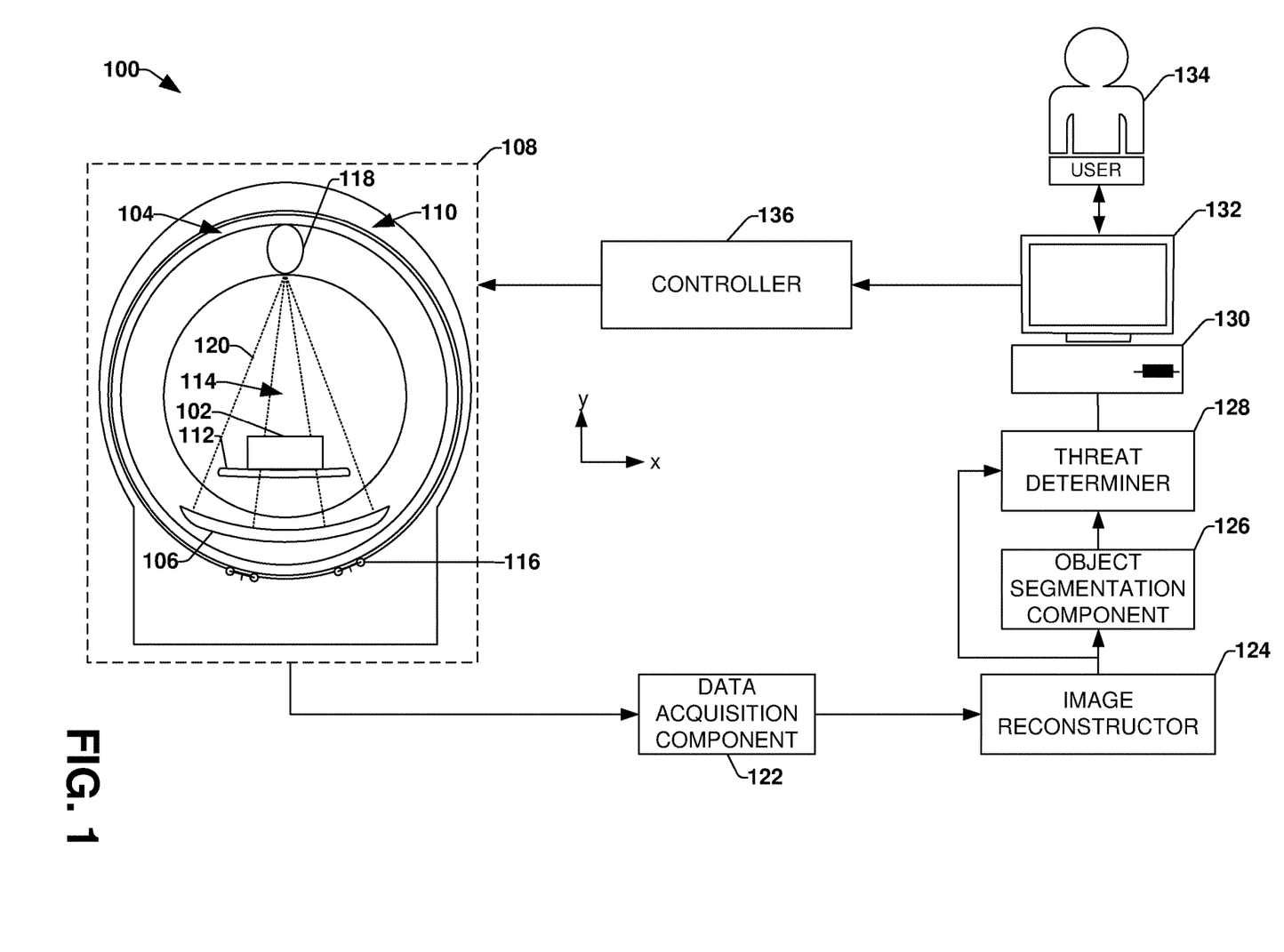
FIG. 1 illustrates an example environment of an imaging modality.

FIG. 1 is an illustration of an example environment 100 comprising a computed tomography (CT) system that may be configured to generate images representative of an object 102 (e.g., baggage, patient, etc.) or aspect(s) thereof under examination and detect certain types of items concealed within the object 102 using the generated image(s). Such an example system may be employed for identifying potential threat containing items (e.g., threat material concealed within a potential concealment item such as an electronic device or a thin dense object), from a class of items, inside baggage that has been subjected to imaging, for example.

It may be appreciated that while the example environment 100 describes a CT system configured to generate two-dimensional and/or three-dimensional images of the object 102 under examination (or previously under examination), other radiation imaging modalities are also contemplated for generating images from which items within the object 102 may be segmented for detection and classification. Moreover, the arrangement of components and/or the types of components included in the example environment 100 are merely provided as an example arrangement. By way of example, in some embodiments, a data acquisition component 122 is comprised within a detector array 106.

In the example environment 100, an examination apparatus 108 of the CT system is configured to examine one or more objects such as the object 102. The examination apparatus 108 can comprise a rotating gantry 104 and a (stationary) support structure 110 (e.g., which may encase and/or surround at least a portion of the rotating gantry 104 (e.g., as illustrated with an outer, stationary ring, surrounding an outside edge of an inner, rotating ring)). During an examination of the object 102, the object 102 can be placed on a support article 112, such as a bed or conveyor belt, for example, that is selectively positioned in an examination region 114 (e.g., a hollow bore in the rotating gantry 104), and the rotating gantry 104 can be rotated and/or supported about the object 102 by a rotator 116, such as a motor, drive shaft, chain, roller truck, etc.

The rotating gantry 104 may surround a portion of the examination region 114 and may comprise one or more radiation sources 118 (e.g., an ionizing x-ray source, gamma radiation source, etc.) and a detector array 106 that is mounted on a substantially diametrically opposite side of the rotating gantry 104 relative to the radiation source(s) 118.

During an examination of the object 102, the radiation source(s) 118 emits fan, cone, wedge, and/or other shaped radiation 120 configurations from a focal spot(s) of the radiation source(s) 118 (e.g., a region within the radiation source(s) 118 from which radiation 120 emanates) into the examination region 114. It may be appreciated that such radiation 120 may be emitted substantially continuously and/or may be emitted intermittently (e.g., a brief pulse of radiation is emitted followed by a resting period during which the radiation source(s) 118 is not activated).

As the emitted radiation 120 traverses the object 102, the radiation 120 may be attenuated differently by different aspects of the object 102. Because different aspects attenuate different percentages of the radiation 120, an image(s) may be generated based upon the attenuation, or variations in the number of photons that are detected by the detector array 106. For example, more dense aspects of the object 102, such as a bone, a metal plate, electronic components, etc., may attenuate more of the radiation 120 (e.g., causing fewer photons to strike the detector array 106) than less dense aspects, such as skin or clothing.

The detector array 106 is configured to directly convert (e.g., using amorphous selenium and/or other direct conversion materials) and/or indirectly convert (e.g., using photodetectors and/or other indirect conversion materials) detected radiation into signals that can be transmitted from the detector array 106 to the data acquisition component 122 configured to compile signals that were transmitted within a predetermined time interval, or measurement interval, using various techniques (e.g., integration, photon counting, etc.). It may be appreciated that such a measurement interval may be referred to as a "view" and generally reflects signals generated from radiation 120 that was emitted while the radiation source(s) 118 was at a particular angular range relative to the object 102. Based upon the compiled signals, the data acquisition component 122 can generate projection data indicative of the compiled signals, for example.

The example environment 100 further comprises an image reconstructor 124 configured to receive the projection data that is output by the data acquisition component 122. The image reconstructor 124 is configured to generate three-dimensional image data (also referred to as three-dimensional image(s)) of the object 102 from the projection data using a suitable analytical, iterative, and/or other reconstruction technique (e.g., backprojection reconstruction, tomosynthesis reconstruction, iterative reconstruction, etc.). In this way, the data is converted from projection space to image space, a domain that may be more understandable by a user 134 viewing the image(s), for example.

In the example environment 100, an object segmentation component 126 may be configured to receive the image data and to segment items represented in the image data. By way of example, an image of a suitcase may depict clothes, a hair dryer, grooming products, a laptop, and/or other items within the suitcase, and the object segmentation component 126 may segment voxels of the image data into its component parts (e.g., separating voxels of the image data representative of the laptop from voxels of the image data representative of the hair dryer). In this way, representations of items within the suitcase may be isolated and analyzed individually.

In the example environment 100, a threat determiner 128 can receive the image data from the image reconstructor 124 and/or the image data from the object segmentation component 126. As will be described in more detail below, the threat determiner 128 can be configured to divide the image data representing an item (e.g., which has been segmented by the object segmentation component 126 from the image data of the object), into a set of sub-regions (e.g., dividing a region comprising a three-dimensional image of the laptop into a set of sub-regions). The threat determiner 128 can also be configured to individually evaluate each sub-region to determine whether a sub-region comprises threat material. For example, the threat determiner can evaluate whether enough voxels within the sub-region have CT values within a range of known CT values for a particular type of item such as a threat item and classify the laptop accordingly.

The example environment 100 further comprises a terminal 130, or workstation (e.g., a computer), that may be configured to receive the image data (e.g., output by the object segmentation component 126 and/or the image reconstructor 124) and/or the information output by the threat determiner 128 (e.g., an alert that the laptop potentially comprises threat material). The terminal 130 may also be configured to present the image data and/or information for display on a monitor 132 to the user 134 (e.g., security personnel, medical personnel, etc.). In this way, the user 134 can inspect the image(s) to identify areas of interest within the object 102 and/or receive alerts with a threat item is detected. The terminal 130 can also be configured to receive user input, which can direct operations of the examination apparatus 108 (e.g., a speed of a conveyor belt), for example.

In the example environment 100, a controller 136 is operably coupled to the terminal 130. In one example, the controller 136 is configured to receive input from the terminal 130, such as user input for example, and to generate instructions for the examination apparatus 108 indicative of operations to be performed. For example, the user 134 may desire to reexamine the object 102, and the controller 136 may issue a command instructing the support article 112 to reverse direction (e.g., bringing the object 102 back into an examination region 114 of the examination apparatus 108).

It may be appreciated that the example component diagram is merely intended to illustrate one embodiment of one type of imaging modality and is not intended to be interpreted in a limiting manner. For example, the functions of one or more components described herein may be separated into a plurality of components and/or the functions of two or more components described herein may be consolidated into merely a single component. Moreover, the imaging modality may comprise additional components configured to perform additional features, functions, etc. and/or some components described herein may be optional.

Figure 2:
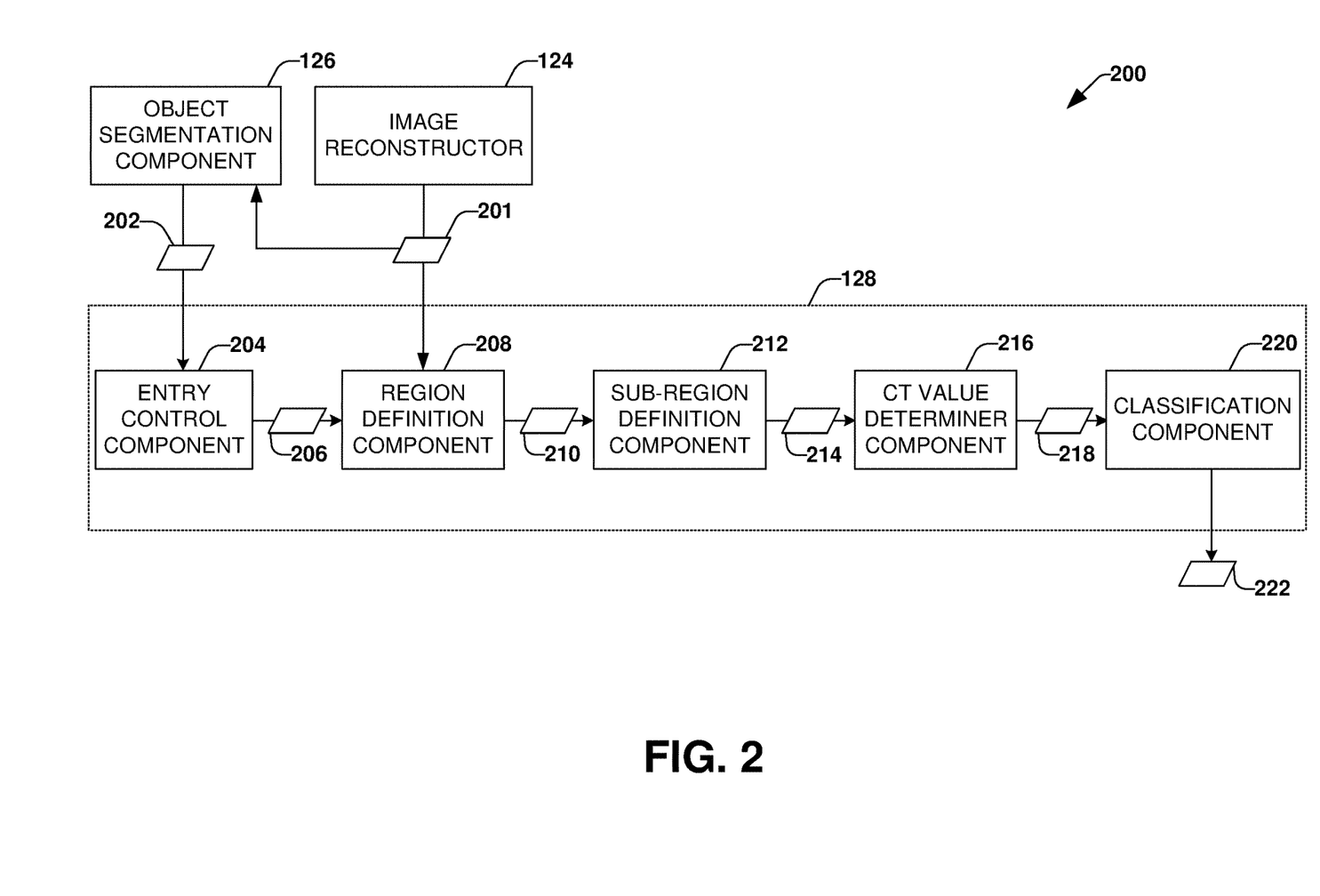
FIG. 2 illustrates an example environment of a threat determiner.
Figure 3:
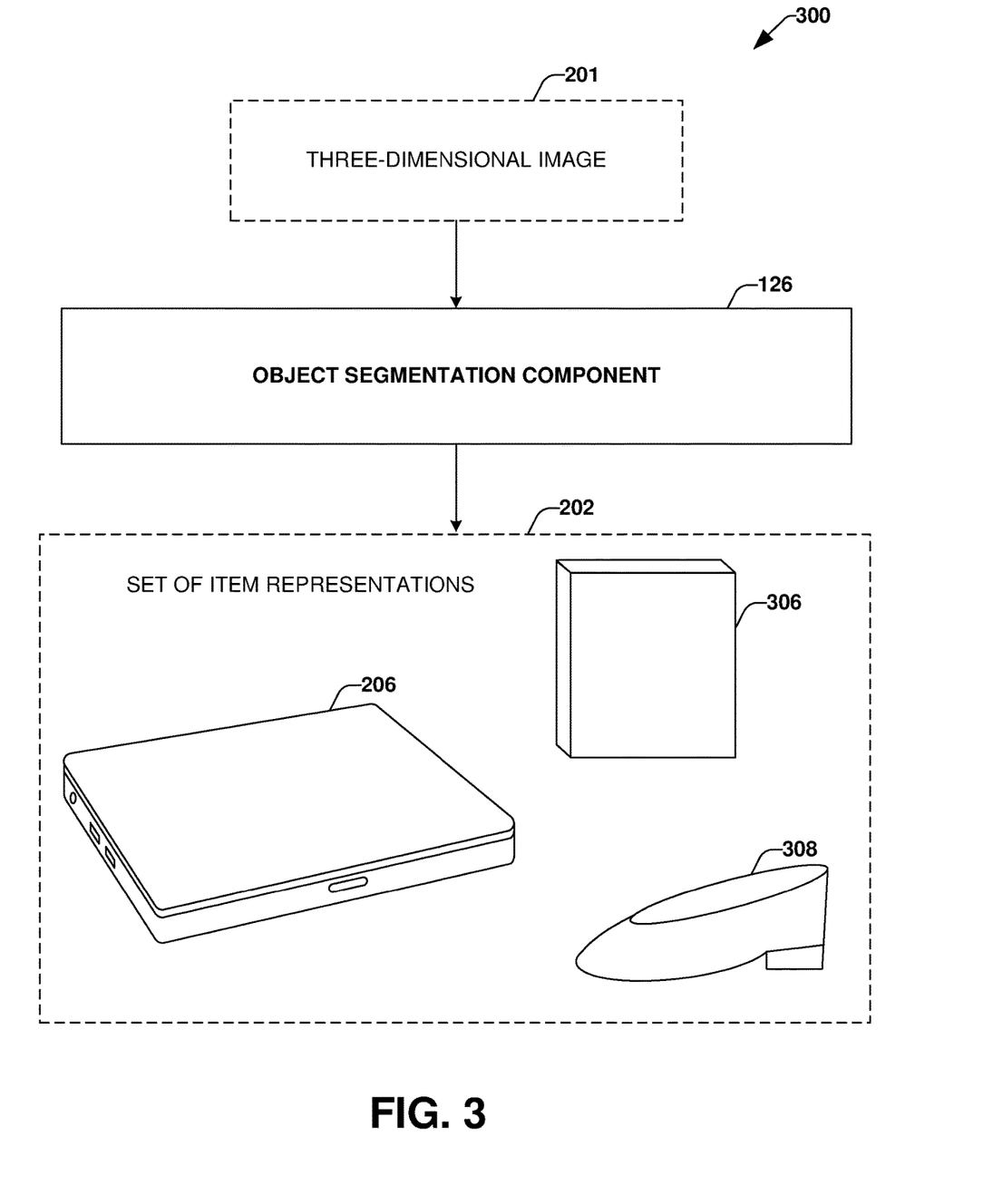
FIG. 3 illustrates an example of segmenting a three-dimensional image.

FIG. 2 is a schematic block diagram of system 200 showing an example threat determiner 128 for classifying an item using localized CT value distribution analysis. The object segmentation component 126 may receive a three-dimensional image 201 of an object, such as a bag, as illustrated in example 300 of FIG. 3. The object segmentation component 126 may segment the three-dimensional image 201 into a set of item representations 202 of items within the bag (e.g., three-dimensional images of individual items within the bag), such as a laptop representation 206, a book representation 306, a shoe representation 308, etc. In an example of segmenting the three-dimensional image 201, item features such as density features, effective atomic number, dimension features, shape features, etc. may be used to identify edges between items and/or isolate voxels representing different items to create the laptop representation 206, the book representation 306, the shoe representation 308, etc.

Figure 4:
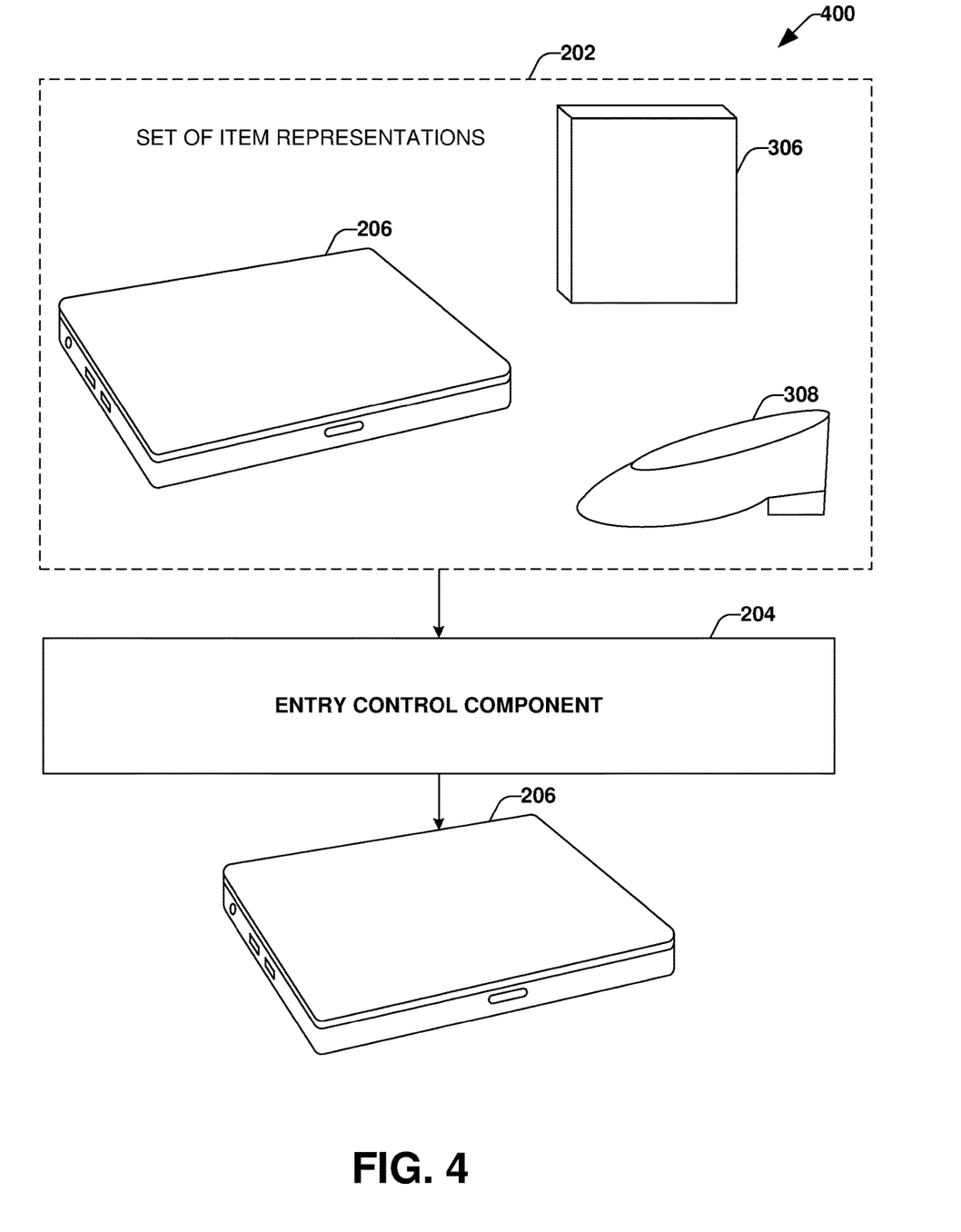
FIG. 4 illustrates an example of identifying a potential concealment item.

An entry control component 204 of the threat determiner 128 may be configured to identify items of particular interest within the object. For example, the entry control component 204 may be configured to identify particular types of items (e.g., electronics) upon which the technique described herein finds particular applicability. As an example, referring to example 400 in FIG. 4, the entry control component 204 may be configured to analyze the image data of one or more items (e.g., derived from the segmentation) to identify items within a particular class of object (e.g., electronics, thin high density items, etc.) based upon shape, density, or z-effective information derived from the segmented images. Using this analysis, the entry control component 204 may identify the laptop representation 206 as depicting a potential concealment item (e.g., an item of particular interest) based upon item features of the laptop representation 206. In this way, the entry control component 204 identifies the laptop representation 206 as a three-dimensional image of a potential concealment item for further evaluation for item classification and/or threat detection.

It may be appreciated that while reference is made to performing threat detection on a subset of all items within the object 102 (e.g., performing threat detection on merely those items identified as potential concealment items by the entry control component 204), such a description is not intended to imply that threat detection is not performed on the other items within the object 102. Rather, techniques outside of the scope of the instant application may be used to identify and/or classify those items. In still another embodiment, the technique described herein may be performed on each item within the object 102, and thus the entry control component 204 may not be present.

Referring back to FIG. 2, images of items that are of particular interest (e.g., images of potential concealment items), such as the laptop representation 206, may be transmitted to a region definition component 208. The region definition component 208 is configured to expand the three-dimensional image of the item by including voxels of the three-dimensional image that neighbor the item (e.g., creating a buffer zone around the item to ensure that the entirety of the item is included within the three-dimensional image of the item).

In some embodiments, the region definition component 208 starts by defining a coordinate system relative to the item. The coordinate system may be object orientation independent or object orientation dependent. As an example of an object orientation independent coordinate system, the region definition component 208 may determine Euclidean vectors that are defined by the examination apparatus 108 (e.g., the Z-axis of the item corresponds to a direction in which the item was moved by the support article 112). As an example of an object orientation dependent coordinate system, the region definition component 208 may determine eigenvectors that are defined based upon the dimensions of the items. By way of example, referring to example 500 in FIG. 5, the region definition component 208 has defined eigenvectors. A first eigenvector 502 (e.g., the X-axis) is defined along a longest dimension of the laptop. From there, a second eigenvector 504 (e.g., the Y-axis) and a third eigenvector 506 (e.g., the Z-axis) are defined to be perpendicular to the first eigenvector 502.

Figure 5:
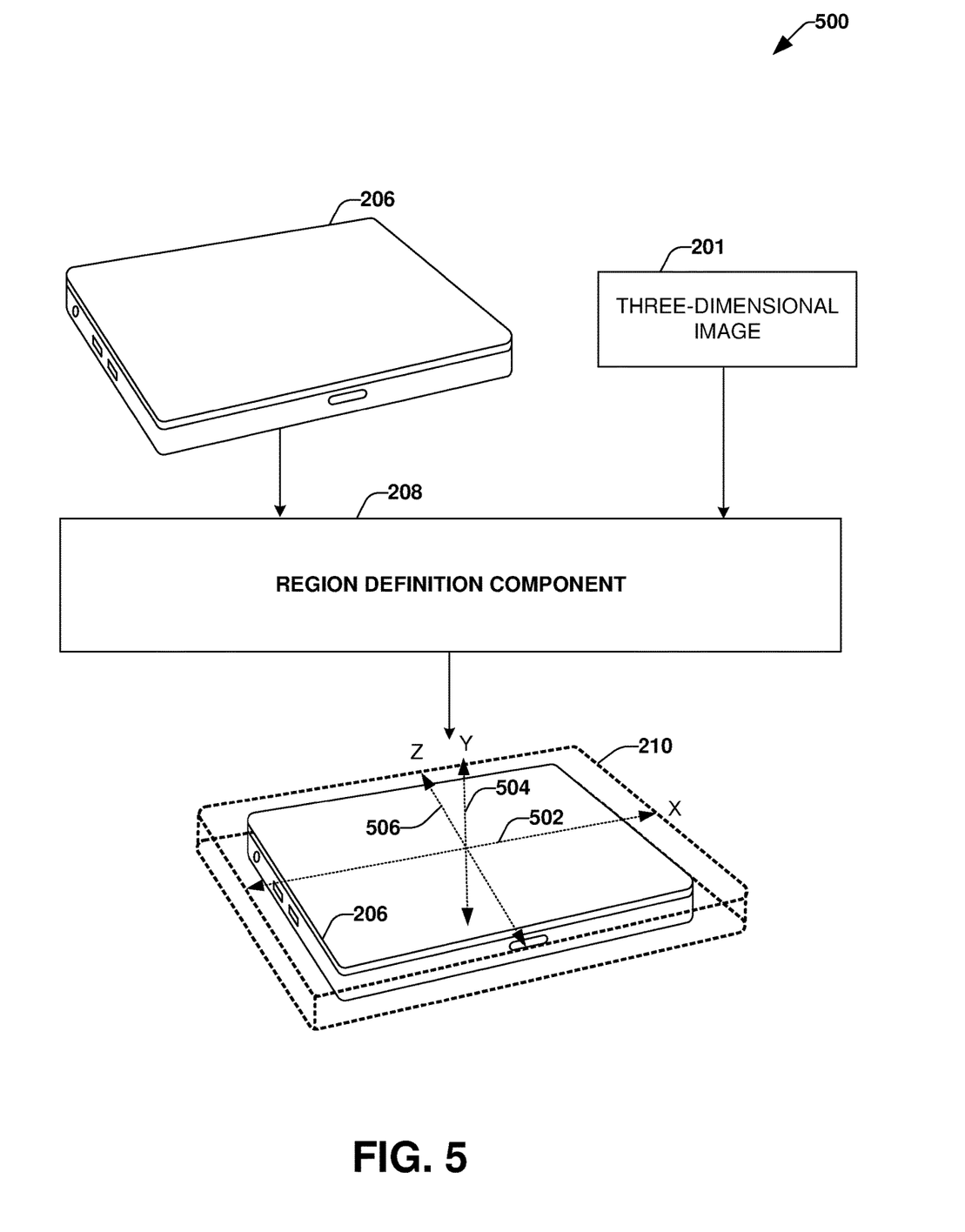
FIG. 5 illustrates an example of defining a region of a three-dimensional image of an object that encompasses a potential concealment item.

Using this coordinate system, the region definition component 208 defines a region 210 of a three-dimensional image 201 of the object that encompasses the item as well as voxels neighboring those representative of the item. For example, the region definition component 208 may be set to have a minimum distance threshold of two voxels. Thus, the region definition component 208 may form the region 210 around the laptop representation 206 that comprises voxels representing the laptop as well as voxels that immediately neighbor those voxels representing the laptop and those voxels that are spaced apart from the voxels representing the laptop by no more than one voxel. Thus, the region 210 may comprise voxels representing the laptop and also comprise a buffer zone around the laptop that comprises voxels that are not representative of the laptop (e.g., voxels that instead represent air, clothing, or any other item within close spatial proximity to the laptop).

In still some embodiments, the region definition component 208 may be configured to define the region 210 to have a predetermined shape, where the dimensions of the predetermined shape are a function of the minimum distance threshold as well as the coordinate system. For example, the region definition component 208 may be configured to define a box-shaped region 210 around the laptop and to ensure that, at a minimum, the voxels representing the laptop are surrounded by a buffer zone of at least two voxels. Using these criteria, the region definition component 208 may create a box-shaped region 210 around the laptop representation 206 whose dimensions are a function of the aforementioned criteria. It may be appreciated that due to this criteria and the shape of the item, in some areas voxels that are separated from those voxels representing the item by three or more voxels may be included within the box-shaped region 210.

In still other embodiments, the region is defined to include only those voxels representing the item and those voxels within a predetermined distance of the voxels representing the item. Thus, the shape of the region may substantially match the shape of the item.

Referring back to FIG. 2, a sub-region definition component 212 of the threat determiner 128 may divide the region 210 defined by the region definition component 208 into a set of sub-regions. In some embodiments, the coordinate system defined by the region definition component 208 is used to define how the region 210 is divided into the set of sub-regions.

Figure 6:
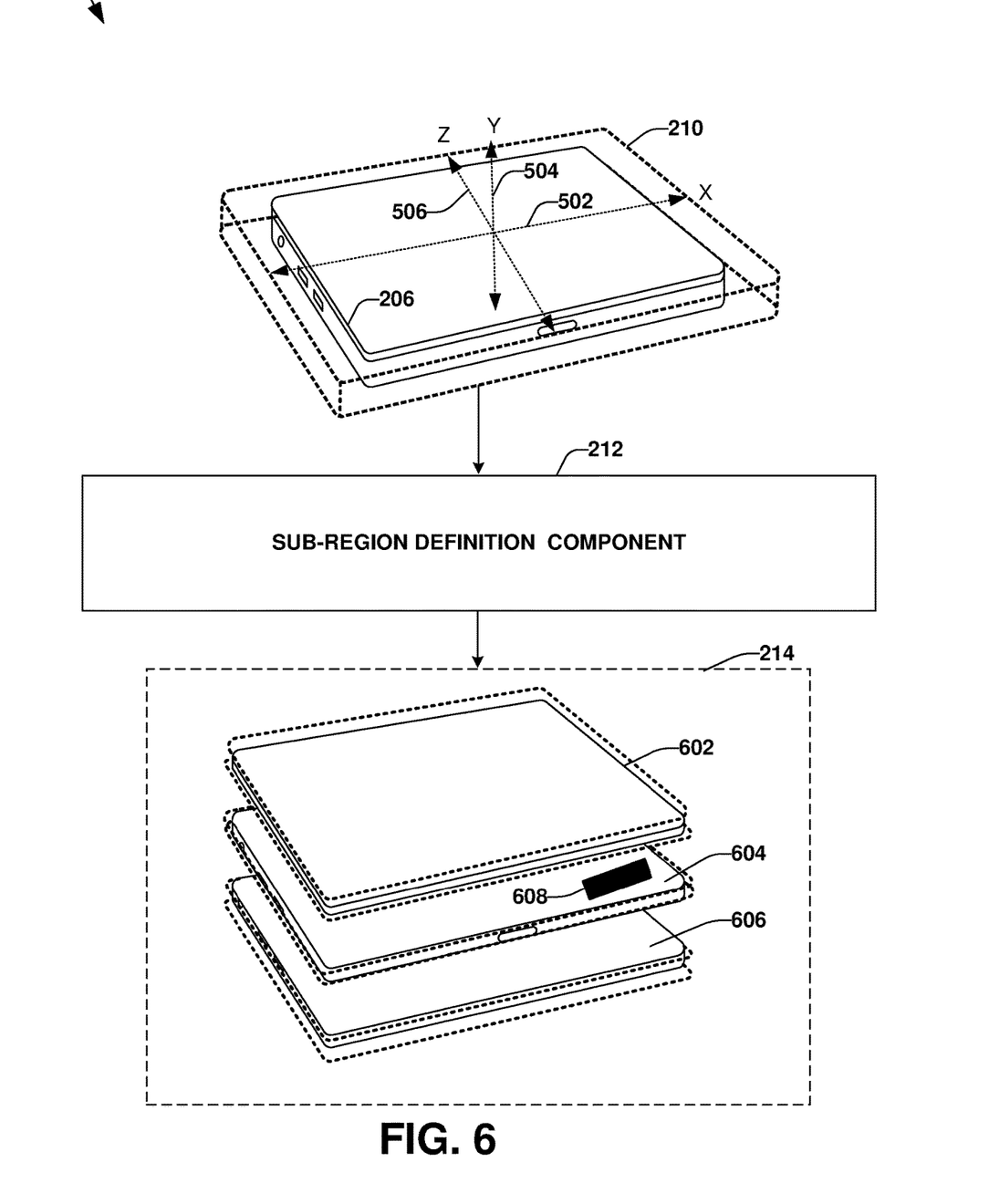
FIG. 6 illustrates an example of dividing a region of a three-dimensional image of an object that encompasses a potential concealment item into a set of sub-regions.

By way of example, referring to example 600 in FIG. 6, the sub-region definition component 212 may divide the region 210 into sub-regions 214, where each sub-region 602, 604, 606 represents a layer (e.g., slice) of the region 210 stacked along a coordinate vector (e.g., the second eigenvector 504). Thus, each sub-region 602, 604, 606 includes voxels representing a portion of the laptop and voxels of the buffer zone neighboring the voxels representing a portion of the laptop included in that layer. For example, the region 210, encompassing the laptop, may be divided into a first sub-region 602 encompassing a screen of the laptop, a second sub-region 604 encompassing a keyboard and hard drive bay of the laptop (e.g., in which threat material 608 has been stored), and a third sub-region 606 encompassing a motherboard of the laptop.

It may be appreciated that any number of sub-regions may be defined and that a sub-region may have any shape, size, or configuration. Moreover, the number of sub-regions and/or their shape, size, or configuration may be based upon a type of potential concealment item under analysis. For example, the shape and/or size of sub-regions that are selected when the potential concealment item under analysis is a camera may be different than the shape and/or size of sub-regions that are selected when the potential concealment item is a laptop due to the differences in shape and/or due to a prior knowledge about where and to what extent explosive material can be concealed within the item.

Moreover, the sub-regions may be mutually exclusive (e.g., comprise non-overlapping voxels) or may partially overlap (e.g., at least some voxels may be shared between sub-regions). Further, sub-regions may have the same or different thicknesses, which may be based upon the type of potential concealment item under analysis and/or properties of components of the potential concealment item (e.g., a shape and size of the motherboard). Still further, a sub-region may be defined to encompass an entire component of an item (e.g., the entire laptop screen), a portion of the component (e.g., a section of the laptop screen), or multiple components (e.g., the section of the laptop screen and a section of a keyboard).

Referring back to FIG. 2, a CT value determiner component 216, of the threat determiner 128, may be configured to determine CT values for each sub-region within the set of sub-regions 214 or rather may be configured to determine a distribution of those CT values. A CT value, as used herein, can be a density value and/or a z-effective value that has been calculated by the image reconstructor 124 when reconstructing the three-dimensional image of the object. By way of example, each voxel within a sub-region may be binned into one of a set of bins based upon the CT value of the voxel, where each bin may correspond to a different range of one or more CT values.

Figure 7:
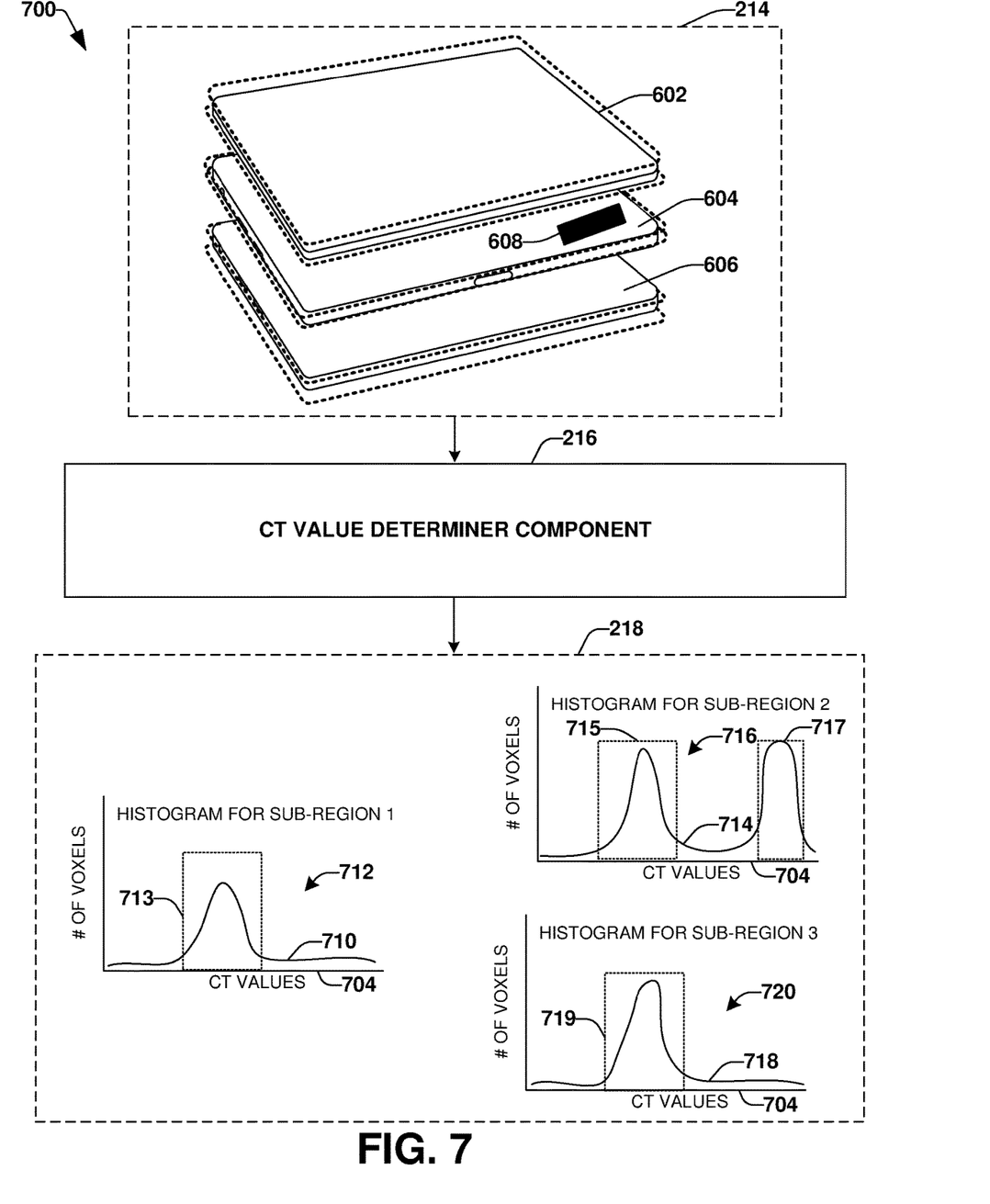
FIG. 7 illustrates an example of calculating computed tomography (CT) values.

Referring to FIG. 7, an example 700 describing the operation of the CT value determiner component 216 is illustrated. The CT value determiner component 216 is configured to create a set of histograms 218 for the region 210, which each histogram 712, 716, and 720 within the set of histograms 218 represents one sub-region 602, 604, and 606. For example, the CT value determiner component 216 may create a first histogram 712 for the first sub-region 602, a second histogram 716 for the second sub-region 604, and a third histogram 720 for the third sub-region 606. An X-axis 704 of each histogram 712, 716, 720 may represent CT value and a Y-axis 702 of each histogram 712, 716, and 720 may represent a numbers of voxels. Thus, the histograms 712, 716, and 720 show, for each sub-region, the number of voxels that have each CT value.

It may be appreciated that while the example histograms depict a line graph, in still other embodiments, the histograms may be bar graphs, where each bar represents a range of CT values (e.g., each bar represents more than one CT value). Moreover, the size of the bins (e.g., the number of CT values represented by the bar) may differ across the histogram. For example, explosives may fall within a specified CT range. Some bins, representing CT values far away from the specified CT range may be larger (e.g., each bin may represent a 100 unit range of CT values) whereas bins representing CT values closer to the specified CT range may be smaller (e.g., each bin may represent a 30 unit range of CT values) to better discriminate explosives from benign items have a CT value that is close to the CT value of an explosive, for example.

Referring back to FIG. 2, a classification component 220, of the threat determiner 128, may be configured to receive the set of histograms 218 and evaluate each histogram of the set of histograms 218 to classify the item being analyzed as a potential first type of item (e.g., threat item) or a second type of item (e.g., a non-threat or benign item). For example, the classification component 220 may evaluate the bins or histograms derived therefrom to determine whether the number of voxels within a bin representing CT values that correspond to the CT values of explosive items exceeds a specified threshold for any of the sub-regions. If one or more of the sub-regions include, within a given range of CT values, a number of voxels that exceeds the specified threshold or a number of voxels that exceeds an expected number by the specified threshold, the item may be classified as a threat item.

Figure 8:
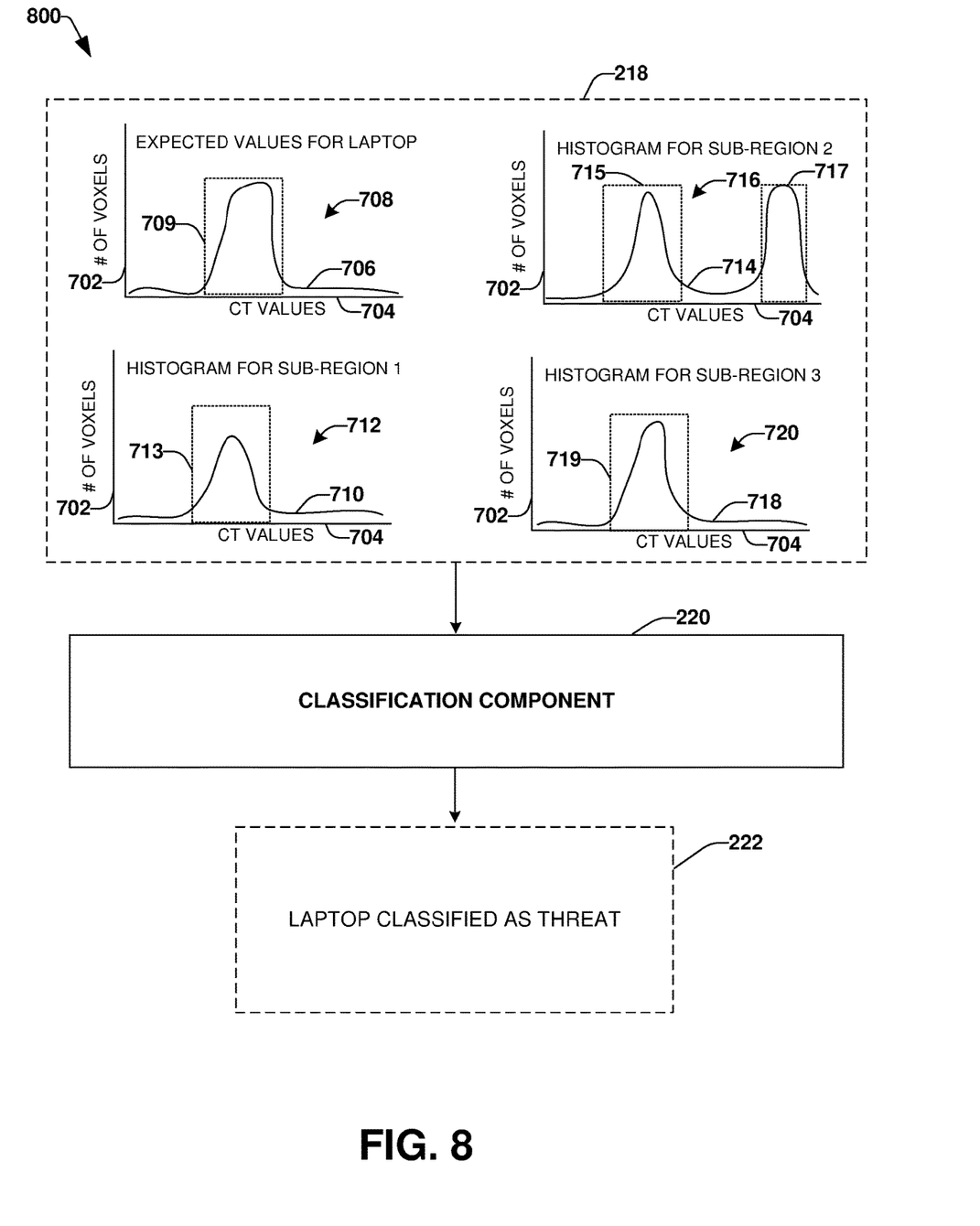
FIG. 8 illustrates an example of classifying a potential concealment item.

By way of example, referring to example 800 in FIG. 8, the classification component 220 receives the set of histograms 218 generated by the CT value determiner component 216 in example 700 and evaluates the histogram for each sub-region individually to determine whether the laptop should be classified as a potential first type of item, such as a threat item comprising threat material. The laptop may be classified as a potential first type of item (e.g., a potential explosive item) when the number of voxels, within a sub-region and having CT values within a range of known CT values for a first type of item (e.g., a range of known CT values for explosives), exceeds a specified threshold.

For example, the classification component 220 may compare CT values 710 within the first histogram 712 for the first sub-region 602 to expected CT values 706 within a histogram 708 of expected CT values for a laptop without threat material. Because the CT values 710 within the first histogram 712 do not deviate from the expected CT values 706 within the histogram 708 beyond a specified threshold, the first sub-region 602 may be determined to comprise expected material of a laptop without threat material. For example, the peak 713 of CT values within the first histogram 712 does not deviate from the expected CT value peak 709 within the histogram 708 of expected CT values beyond a threshold amount. Thus, the first sub-region 602 may be determined as comprising the expected material of a laptop without threat material.

The classification component 220 may compare the CT values 714 within the second histogram 716 for the second sub-region 604 to the expected CT values 706 within the histogram 708 of expected CT values for a laptop without threat material. Because a threshold amount of CT values 714 within the second histogram 716 deviate from the expected CT values 706 within the histogram 708, the second sub-region 604 may be determined to comprise material of a first type, such as explosive material or other threat material. For example, while the peak 715 of CT values within the second histogram 716 does not deviate from the expected CT value peak 709 within the histogram 708 of expected CT values beyond a threshold, the second peak 717 of CT values within the second histogram 716 deviates from the expected CT value peak 709 within the histogram 708 of expected CT values beyond the threshold amount. Thus, the second sub-region 604 may be determined to comprise material not expected to be comprised within a laptop. Moreover, this second peak 717 may fall within an expected CT range of threat materials. Thus, it may be found that this second sub-region 604 potentially comprises a threat material. As such, the laptop may be classified 222 as a potential threat item (e.g., a potential first type of item) irrespective of whether other sub-regions of the laptop are indicative of threat material.

In some embodiments, upon the identification of an anomaly, such as the second peak 717, that is indicative of a type of item of interest (e.g., threat material), the process may stop (e.g., the CT value determiner component 216 may stop evaluating sub-regions and generate a notice to the terminal 130 that further (e.g., hands-on) inspection is warranted). In other embodiments, the classification component 220 may continue its analysis on other sub-regions even if one sub-region has already been identified as potentially containing material of interest (e.g., explosive material). For example, the classification component 220 may compare the CT values 718 within the third histogram 720 for the third sub-region 606 to the expected CT values 706 within the histogram 708 of expected CT values for a laptop without threat material even though the classification component 220 has already determine that the laptop should be classified as a potential threat item due to the anomaly in the second sub-region 604. Because the CT values 718 within the third histogram 720 do not deviate from the expected CT values 706 within the histogram 708 beyond the specified threshold, the third sub-region 606 may be determined to comprise expected material of a laptop without threat material. For example, the peak 719 of CT values within the third histogram 720 does not deviate from the expected CT value peak 709 within the histogram 708 of expected CT values beyond a threshold amount. Thus, the third sub-region 606 may be determined as comprising the expected material of a laptop without threat material.

Because the laptop can be classified on an individual sub-region basis, material of interest (e.g., the threat material 608) can be identified regardless of whether threat material is visually non-contiguous due to artifacts of the three-dimensional image 201 visually splitting up a single threat item or whether threat material is physically non-contiguous due to the threat material being physically split into different smaller threat items that would normally not comprise enough threat material or size to be identified as a threat.

Figure 9:
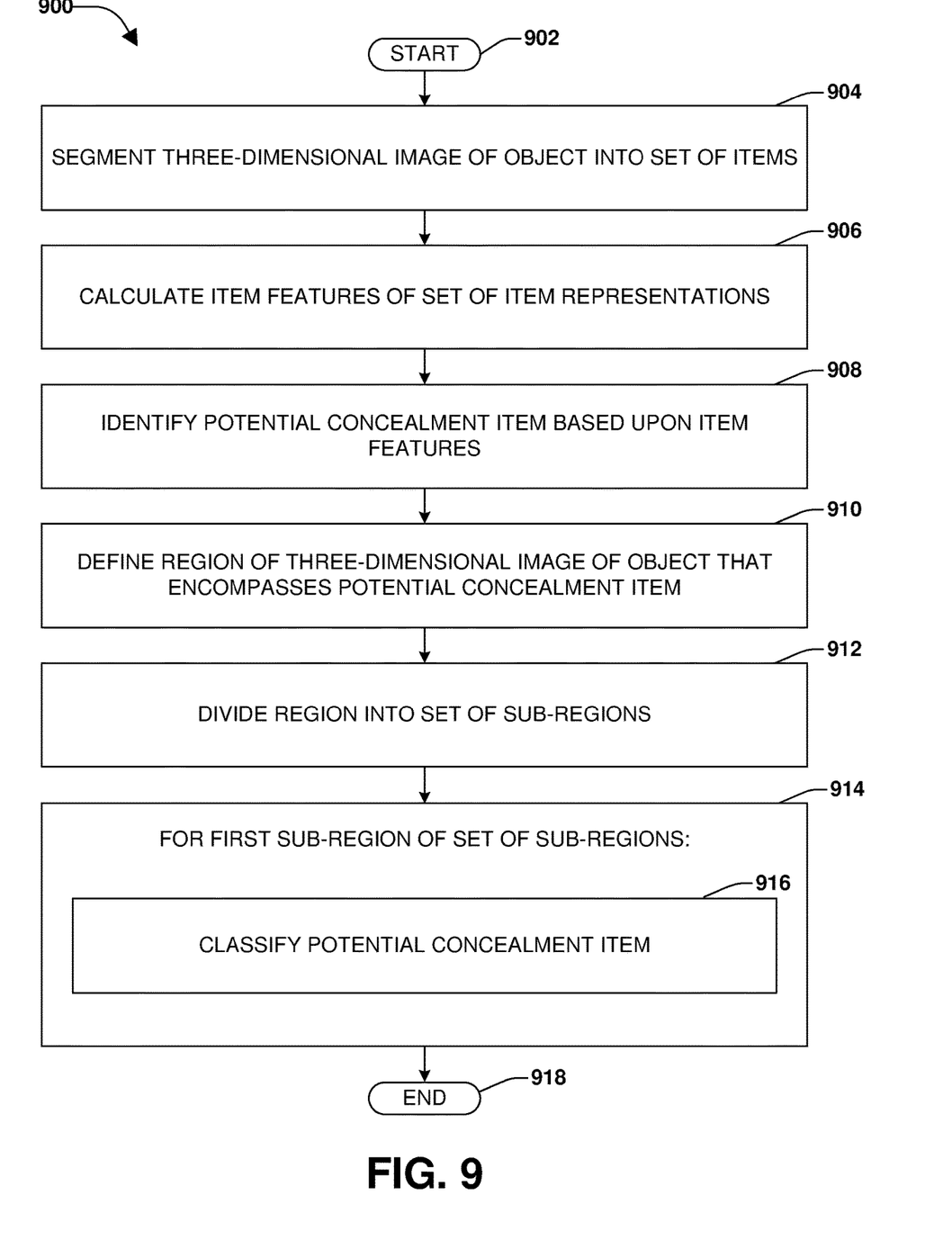
FIG. 9 illustrates a flow diagram of an example method for classifying an item disposed within an object.

FIG. 9 illustrates an example method 900 for classifying an item disposed within an object, depicted between start 902 and end 918. More particularly, the example method 900 describes a technique for identify a potential first type of item (e.g., an explosive item) that may either be visually non-contiguous due to artifacts within a three-dimensional image of the item (e.g., the explosive item may be a single physical item but artifacts of the three-dimensional item may result in the explosive item appearing to be multiple smaller explosive items that would otherwise not have enough threat material or size, individually, to be classified as a threat) or physically non-contiguous due to being stored in separate regions of the item (e.g., the explosive item may be physically separated into smaller explosive material items that are stored in different locations within a camera).

The example method 900 begins at 902 and a three-dimensional image of an object is segmented into a set of item representations at 904. For example, the three-dimensional image may comprise a CT image depicting a bag object. The bag object may comprise a set of items, such as shaving cream, a shirt, a tablet, and/or other items. At 906, item features of the set of item representations may be calculated. The item features may comprise density features, shape features, dimensionality features, atomic value features, etc. for the set of items. For example, the tablet may be identified based upon shape features and density features indicative of a thin dense item comprising electronic components.

At 908, a potential concealment item may be identified based upon the item features. For example, electronics items, such as the tablet, may be potential concealment items because they can be used to conceal items of interest such as threat material (e.g., explosives) that are hard to detect within the electronics items due to the electronics items being flat dense objects. In this way, the potential concealment item, such as the tablet, may be identified based upon a potential concealment item representation, of the potential concealment item, (e.g., a segmented image of the potential concealment item) having item features indicative of an electronics device (e.g., density, atomic number, shape, size, etc.).

At 910, a region of a three-dimensional image of an object that encompasses the potential concealment item, within the three-dimensional image of the object, may be defined. The region may encompass voxels representing the potential concealment item (e.g., voxels of the potential concealment item representation). The region may also comprise a buffer zone of voxels that do not represent the potential concealment item (e.g., neighboring voxels, within the three-dimensional image of the object, that neighbor the potential concealment item). For example, the buffer zone may comprise some voxels of a tablet case within which the tablet is stored and voxels of a shirt that is nearby the tablet within the bag. The buffer zone may be defined to comprise any number, shape, or configuration of voxels not representing the potential concealment item. The region may comprise any shape, size, or configuration.

At 912, the region may be divided into a set of sub-regions. The set of sub-regions may comprise layers (slices) of the potential concealment item (e.g., where each layer may comprise some voxels representative of the potential concealment item and some voxels within the buffer zone) that are taken along a dimension within the three-dimensional image, such as along an eigenvector determined for the potential concealment item. Such sub-regions may have the same or different thicknesses. Moreover, such sub-regions may be mutually exclusive (e.g., no voxels are shared between two sub-regions) or overlapping (e.g., some voxels may be shared between two sub-regions).

For the first sub-region of the set of sub-regions, CT values of each voxel disposed within the first sub-region may be processed for classification of the potential concealment item. The CT values may correspond to density information, z-effective information, or any other data. In an example, the voxels may be binned into a set of bins based upon the CT values. A bin may be indicative of a number of voxels having a particular range of CT values. In another example, the CT values may be used to generate a histogram of CT values (e.g., a localized density distribution for the sub-region). The histogram may plot numbers of voxels having certain CT values.

At 916, the potential concealment item may be classified as comprising a potential first type of item (e.g., an explosive tablet) when a number of voxels, within the first sub-region and having CT values within a range of known CT values for a first type of item (e.g., CT values of explosives), exceeds a specified threshold. In an example, if a number of voxels, within a bin corresponding to the range of known CT values for the first type of item, exceeds a threshold, then the first sub-region may be determined to comprise material of the first type of item, such as explosive material. In this way, the potential concealment item, such as the tablet, may be determined to be an explosive item.

It may be appreciated that each sub-region within the set of sub-regions may be individually evaluated for classifying the potential concealment item. In an example, the first sub-region and the second sub-region may be determined to not comprise a threshold number of voxels within the range of known CT values for the first type of item. However, the third sub-region may be determined to comprise the threshold number of voxels within the range of known CT values for the first type of item. In this way, the tablet may be classified as the potential first type of item, such as the explosive tablet, even though the first sub-region and the second sub-region were determined to not comprise material of the first type of item.

In another example, the potential concealment item may be classified as the first type of item notwithstanding the first type of item being visually non-contiguous (e.g., artifacts of the three-dimensional image may result in a single contiguous explosive item appearing as smaller explosive items that otherwise would not comprise enough explosive material or size to be classified as an explosive) or physically non-contiguous (e.g., an explosive item may be physically separated into smaller individual explosive items and stored within different locations of the tablet). For example, the first sub-region and the third sub-region (e.g., non-contiguous sub-regions) may be determined to comprise a threshold numbers of voxels within the range of known CT values for the first type of item. However, the second sub-region (e.g., adjacent to the first sub-region and the third sub-region) may be determined to not comprise the threshold number of voxels within the range of known CT values for the first type of item. In this way, the tablet may be classified as the potential first type of item, such as the explosive tablet, even though the first sub-region and the third sub-region are not adjacent sub-regions.

The example method 900 ends at 918.

Figure 10:
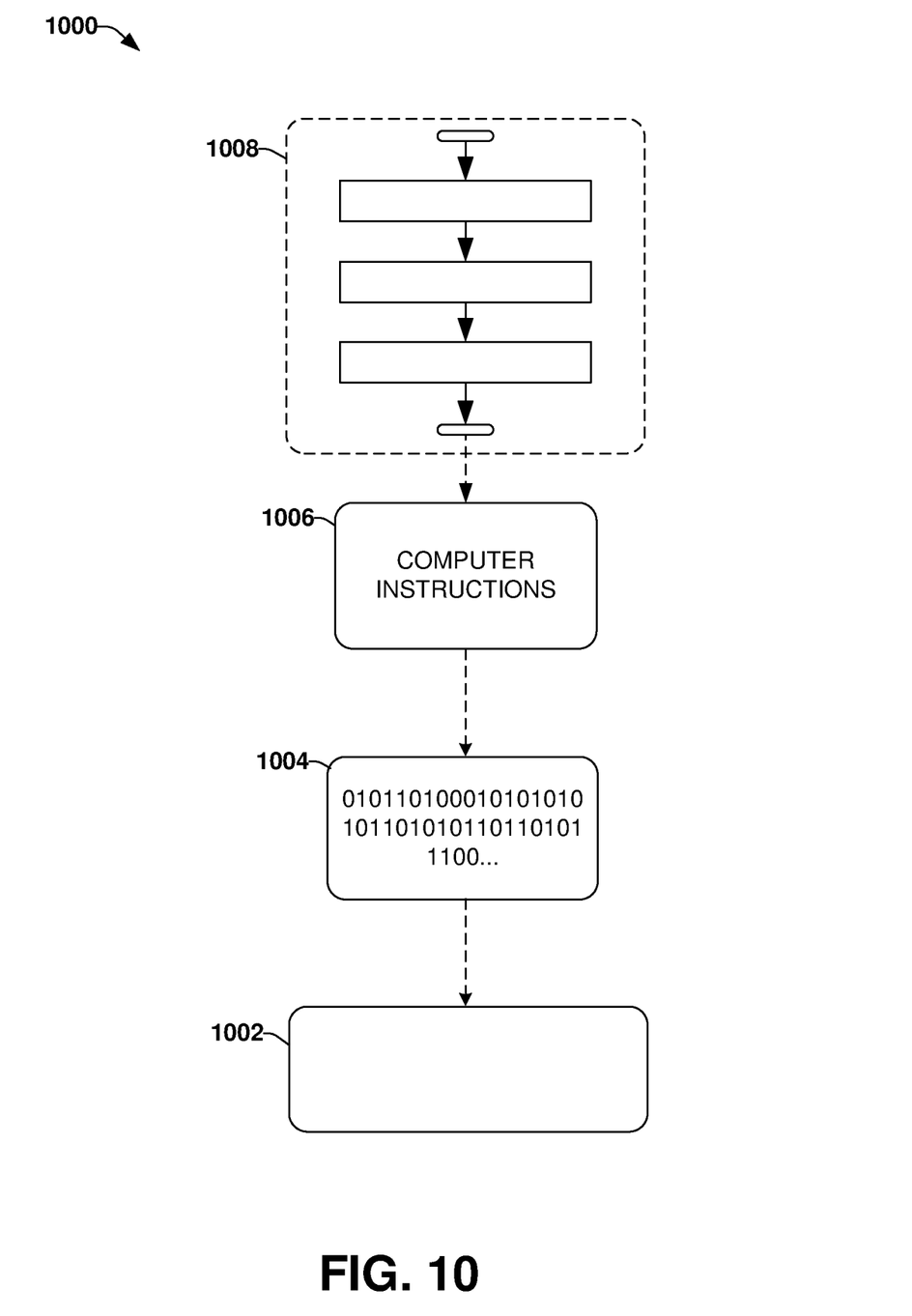
FIG. 10 is an illustration of an example computer-readable medium comprising processor-executable instructions configured to embody one or more of the provisions set forth herein.

Still another embodiment involves a computer-readable medium comprising processor-executable instructions configured to implement one or more of the techniques presented herein. An example computer-readable medium that may be devised in these ways is illustrated in FIG. 10, wherein the implementation of embodiment 1000 comprises a computer-readable medium 1002 (e.g., a CD-R, DVD-R, or a platter of a hard disk drive), on which is encoded computer-readable data 1004. This computer-readable data 1004 in turn comprises a set of processor-executable instructions 1006 configured to operate according to one or more of the principles set forth herein. In one such embodiment 1000, the processor-executable instructions 1006 may be configured to perform a method 1008, such as at least some of the example method 900 of FIG. 9. In another such embodiment, the processor-executable instructions 1006 may be configured to implement a system, such as at least some of the example environment 100 of FIG. 1 and/or at least some of the schematic block diagram of system 200 of FIG. 2, for example. Many such computer-readable media may be devised by those of ordinary skill in the art that are configured to operate in accordance with one or more of the techniques presented herein.

It may be appreciated that "example" and/or "exemplary" are used herein to mean serving as an example, instance, or illustration. Any aspect, design, etc. described herein as "example" and/or "exemplary" is not necessarily to be construed as advantageous over other aspects, designs, etc. Rather, use of these terms is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B or the like generally means A or B or both A and B.

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. Similarly, illustrated ordering(s) of acts is not meant to be limiting, such that different orderings comprising the same of different (e.g., numbers) of acts are intended to fall within the scope of the instant disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

What is claimed is:

1. A method for classifying an item disposed within an object, comprising:
   receiving a three-dimensional image of the item;
   dividing the three-dimensional image of the item into a set of sub-regions;
   for a first sub-region of the set of sub-regions:
      binning voxels disposed within the first sub-region into a first set of bins based upon computed tomography (CT) values of each voxel disposed within the first sub-region; and
      classifying the item as a potential first type of item when a number of voxels, within the first sub-region having CT values within a range of known CT values for a first type of item, exceeds a specified threshold.

2. The method of claim 1, wherein the first type of item corresponds to a potential explosive item and the range of known CT values corresponds to a range of known CT values for explosives.

3. The method of claim 1, wherein a CT value corresponds to a density value.

4. The method of claim 1, wherein a CT value corresponds to a z-effective value.

5. The method of claim 1, comprising:
   receiving a three-dimensional image of the object in which item is disposed; and
   segmenting the three-dimensional image of the object to isolate the three-dimensional image of the item from a remaining portion of the three-dimensional image of the object.

6. The method of claim 5, comprising:
   determining eigenvectors of the item using the three-dimensional image of the item; and
   defining a region that comprises the three-dimensional image of the item and a set of voxels neighboring the three-dimensional image of the item and not representative of the item.

7. The method of claim 6, wherein the dividing comprises dividing the region, including the three-dimensional image of the item, into a set of sub-regions.

8. The method of claim 6, wherein the receiving a three-dimensional image of the item comprises receiving the set of voxels neighboring the three-dimensional image of the item.

9. The method of claim 1, comprising:
for a second sub-region of the set of sub-regions:
binning voxels disposed within the second sub-region into the first set of bins based upon CT values of each voxel disposed within the second sub-region; and
classifying the item as the potential first type of item when a number of voxels, within the second sub-region that have CT values within the range of known CT values for the first type of item, exceeds the specified threshold.

10. The method of claim 9, wherein the item is classified as the potential first type of item when the number of voxels within the second sub-region that have CT values within the range of known CT values for the first type of item exceeds the specified threshold irrespective of whether the number of voxels within the first sub-region having CT values within the range of known CT values for the first type of item exceeds the specified threshold.

11. The method of claim 9, wherein the first sub-region and the second sub-region partially overlap.

12. The method of claim 9, wherein the first sub-region and the second sub-region are mutually exclusive.

13. The method of claim 9, wherein the first sub-region has a first thickness and the second sub-region has a second thickness different than the first thickness.

14. The method of claim 1, comprising:
determining eigenvectors of the item using the three-dimensional image of the item, wherein each sub-region of the set of sub-regions corresponds to a slice of the item along a first Eigen vector.

15. The method of claim 1, comprising:
computing a histogram for the first sub-region based upon the CT values of each voxel disposed within the first sub-region.

16. A computing device comprising:
a processing unit; and
memory comprising processor-executable instructions that when executed by the processing unit;
cause performance of operations, the operations comprising:
segmenting a three-dimensional image of an object into a set of item representations;
calculating item features of the set of item representations;
identifying a potential concealment item from the set of item representations based upon item features of a potential concealment item representation, of the set of item representations, for the potential concealment item;
defining a region within the three-dimensional image of the object that encompasses the potential concealment item;
dividing the region into a set of sub-regions; and
for a first sub-region of the set of sub-regions, classifying the potential concealment item as comprising a potential first type of item when a number of voxels, within the first sub-region having CT values within a range of known CT values for a first type of item, exceeds a specified threshold.

17. The computing device of claim 16, wherein an item feature is indicative of an electronics device.

18. The computing device of claim 16,
for a second sub-region of the set of sub-regions, classifying the potential concealment item as comprising the potential first type of item when a number of voxels, within the second sub-region and having CT values within the range of known CT values for the first type of item, exceeds the specified threshold.

19. The computing device of claim 18, wherein the potential concealment item is classified as comprising the potential first type of item within the first sub-region but not within the second sub-region.

20. The computing device of claim 18, wherein the potential concealment item is classified as comprising a first portion of the potential first type of item within the first sub-region and a second portion of the potential first type of item within the second sub-region.

21. A non-transitory computer readable medium comprising computer executable instructions that when executed via a processing unit cause performance of operations, the operations comprising:
segmenting a three-dimensional image of an object into a set of item representations;
calculating item features of the set of item representations;
identifying a potential concealment item from the set of item representations based upon item features of a potential concealment item representation, of the set of item representations, for the potential concealment item;
defining a region within the three-dimensional image of the object that encompasses the potential concealment item;
dividing the region into a first sub-region, a second sub-region, and a third sub-region;
evaluating CT values of voxels within the first sub-region, the second sub-region, and the third sub-region to determine that an instance of a first type of object exists within any of the first sub-region, the second sub-region, or the third sub-region; and
classifying the potential concealment item as comprising a potential first type of item when the first type of object is determined to exist within any of the first sub-region, the second sub-region, or the third sub-region.

* * * * *